United States Patent
Xu

(10) Patent No.: US 10,353,529 B2
(45) Date of Patent: Jul. 16, 2019

(54) CLOUD-COMPUTING GRAPHIC SERVER

(75) Inventor: Yaozhong Xu, Shanghai (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 713 days.

(21) Appl. No.: 13/616,787

(22) Filed: Sep. 14, 2012

(65) Prior Publication Data

US 2013/0268575 A1 Oct. 10, 2013

(30) Foreign Application Priority Data

Apr. 9, 2012 (CN) .......................... 2012 1 0103500

(51) Int. Cl.
*H04L 29/08* (2006.01)
*G06F 3/048* (2013.01)

(52) U.S. Cl.
CPC .......... *G06F 3/048* (2013.01); *H04L 67/1029* (2013.01)

(58) Field of Classification Search
CPC ............ G01C 21/3626; G01C 21/3415; G01C 21/3632; G01C 21/3635; G01C 21/3638;
(Continued)

(56) References Cited

U.S. PATENT DOCUMENTS 6,304,913 B1 * 10/2001 Rune ................. H04L 29/12066
709/241
6,700,588 B1 * 3/2004 MacInnis ................. G06T 9/00
345/629
(Continued)

FOREIGN PATENT DOCUMENTS

| CN | 101849224 | 9/2010 |
| CN | 101924784 | 12/2010 |
| EP | 2384001 A1 * | 11/2011 |

OTHER PUBLICATIONS

Buyya et al. (Market-Oriented Cloud Computing: Vision, Hype, and Reality for delivering IT services as computing utilities, 978-0-7695-3352-0/08, IEEE, 2008.*
(Continued)

*Primary Examiner* — SM A Rahman
*Assistant Examiner* — Emad Siddiqi
(74) *Attorney, Agent, or Firm* — McClure, Qualey & Rodack, LLP

(57) ABSTRACT

The invention provides a cloud-computing graphic server. In one embodiment, the cloud-computing graphic server is coupled to a client host via a network, and includes a plurality of back-end graphic servers and at least one front-end graphic server. The graphic server is coupled to the back-end graphic servers via a high-speed network, receives a request from the client host via the network, determines a plurality of application programs required by the request, and selects a plurality of used back-end graphic servers respectively corresponding to the application programs from the back-end graphic servers. The used back-end graphic servers execute the application programs according to instructions from the front-end graphic server to generate a plurality of graphic surfaces, and the front-end graphic server blends the graphic surfaces to obtain a windows surface datastream and sends the windows surface datastream back to the client host for display via the network.

16 Claims, 9 Drawing Sheets

(58) Field of Classification Search
CPC ............ G01C 21/3664; G01C 21/3667; G01C 21/3629; G06T 1/20; G06T 15/005; G06T 1/00; G06T 9/00
See application file for complete search history.

(56) References Cited

U.S. PATENT DOCUMENTS

| | | | |
|---|---|---|---|
| 8,638,336 | B2 | 1/2014 | Bullard et al. |
| 8,700,745 | B2* | 4/2014 | Dittrich .................... G06F 8/60 709/220 |
| 2010/0253697 | A1* | 10/2010 | Rivera .................. G06T 15/503 345/589 |
| 2010/0283795 | A1* | 11/2010 | Deffeyes ................ G06T 19/00 345/619 |
| 2012/0154389 | A1* | 6/2012 | Bohan ................... G06F 9/5044 345/419 |
| 2012/0191775 | A1* | 7/2012 | Ewe .................... H04L 67/2861 709/203 |
| 2013/0080603 | A1* | 3/2013 | Simons .................. H04L 67/16 709/220 |
| 2013/0101017 | A1* | 4/2013 | De Vleeschauwer .. A63F 13/12 375/240.02 |

OTHER PUBLICATIONS

English language translation of abstract of CN 101849224 (published Sep. 29, 2010).
English language translation of abstract of CN 101924784 (published Dec. 22, 2010).

* cited by examiner

US 10,353,529 B2

CLOUD-COMPUTING GRAPHIC SERVER

CROSS REFERENCE TO RELATED APPLICATIONS

This Application claims priority of China Patent Application No. 201210103500.9, filed on Apr. 9, 2012, the entirety of which is incorporated by reference herein.

BACKGROUND OF THE INVENTION

Field of the Invention

The invention relates to cloud computing, and more particularly to cloud-computing graphic servers.

Description of the Related Art

A graphic server provides a client host with graphic processing services.

Referring to FIG. 1, a block diagram of an ordinary graphic server 106 is shown. The graphic server 106 comprises at least one graphic processor 112 which provides graphic processing services to generate graphic surfaces. A client host 102 is coupled to the graphic server 106 via a network 104. Because the client host 102 lacks the capability of graphic processing, when the client host 102 requires graphic processing services, the client host 102 sends a request to the graphic server 106 via the network 104. When the graphic server 106 receives the request from the client host 102 via the network 104, the graphic server 106 uses the graphic processor 112 to provide graphic processing services to generate a graphic surface, and then sends the graphic surface back to the client host 102.

A graphic server usually does not merely provide graphic processing services to a single client host. When a plurality of client hosts simultaneously send requests to the graphic server 106, because the graphic processor 112 of the graphic server 106 has limited processing capability and therefore cannot simultaneously provide graphic processing services to all client hosts, some of the client hosts must wait for a long time period to receive graphic surfaces generated by the graphic server 106, and service quality is therefore degraded. In addition, if the number of the graphic processor 112 of the graphic server 106 is increased, because it is complicated and difficult for the graphic server 106 to manage a large number of graphic processors 112, high performance of the graphic server 106 cannot be ensured. In addition, if there is a plurality of graphic servers 106 to provide a client host 102 with graphic processing services via the network 104, because different graphic servers have different types of graphic processors and need to be controlled according to different types of instructions, it is difficult to control the graphic servers with an integrated management structure. To avoid the aforementioned deficiencies, a new type of cloud-computing graphic server is required to improve quality of service provided to a client host.

BRIEF SUMMARY OF THE INVENTION

The invention provides a cloud-computing graphic server. In one embodiment, the cloud-computing graphic server is coupled to a client host via a network, and comprises a plurality of back-end graphic servers and at least one front-end graphic server. The back-end graphic servers respectively comprise at least one graphic processing unit (GPU). The front-end graphic server, which is coupled to the back-end graphic servers via a high-speed network, receives a request from the client host via the network, determines a plurality of application programs required by the request, and selects a plurality of used back-end graphic servers corresponding to the application programs from the back-end graphic servers. The used back-end graphic servers execute the application programs according to instructions from the front-end graphic server to generate a plurality of graphic surfaces, and the front-end graphic server blends the graphic surfaces to obtain a windows surface datastream and sends the windows surface datastream back to the client host for display via the network.

The invention also provides a cloud-computing graphic serving method. In one embodiment, a cloud-computing graphic server is coupled to a client host via a network, and comprises at least one front-end graphic server and a plurality of back-end graphic servers respectively comprising at least one graphic processing unit (GPU). The front-end graphic server is coupled to the back-end graphic servers via a high-speed network. First, a request is received from the client host by the front-end graphic server via the network. A plurality of application programs required by the request is determined by the front-end graphic server. A plurality of used back-end graphic servers respectively corresponding to the application programs is selected from the back-end graphic servers by the front-end graphic server. The application programs are then respectively executed by the used back-end graphic servers according to instructions from the front-end graphic server to generate a plurality of graphic surfaces. The graphic surfaces are then blended by the front-end graphic server to obtain a windows surface datastream. The windows surface datastream is then sent back to the client host for display via the network by the front-end graphic server.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
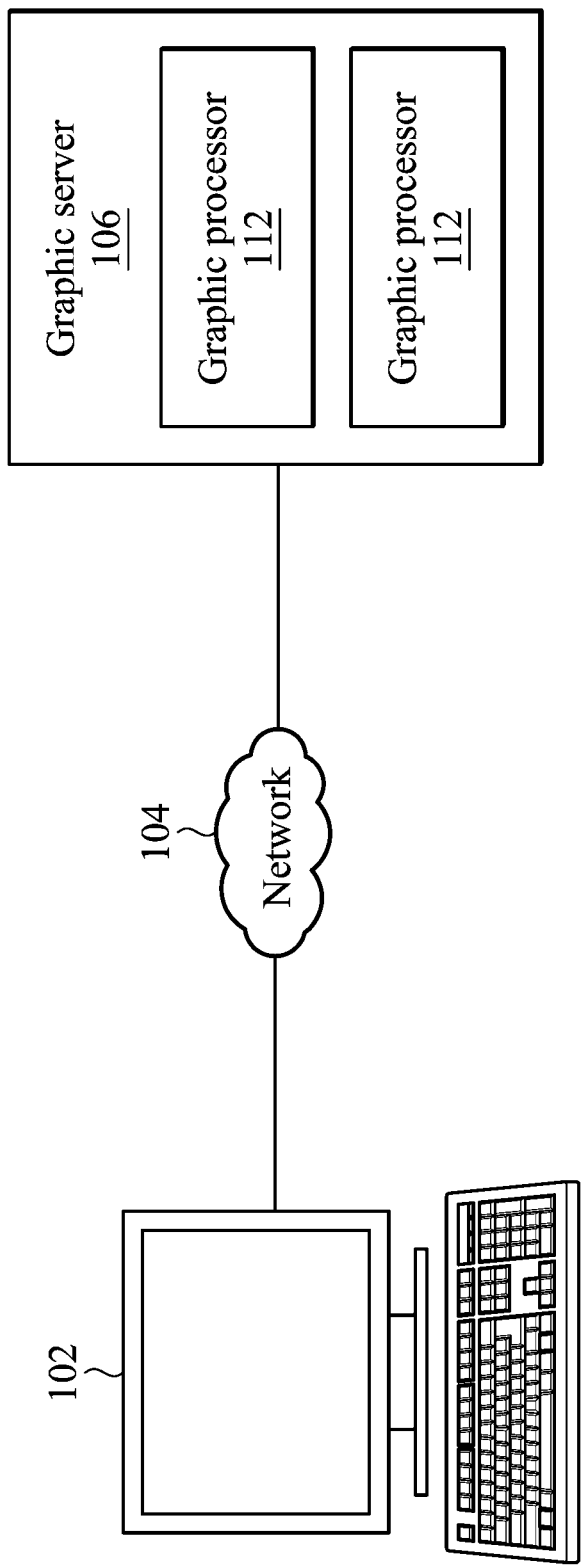
FIG. 1 is a block diagram of an ordinary graphic server.
Figure 2:
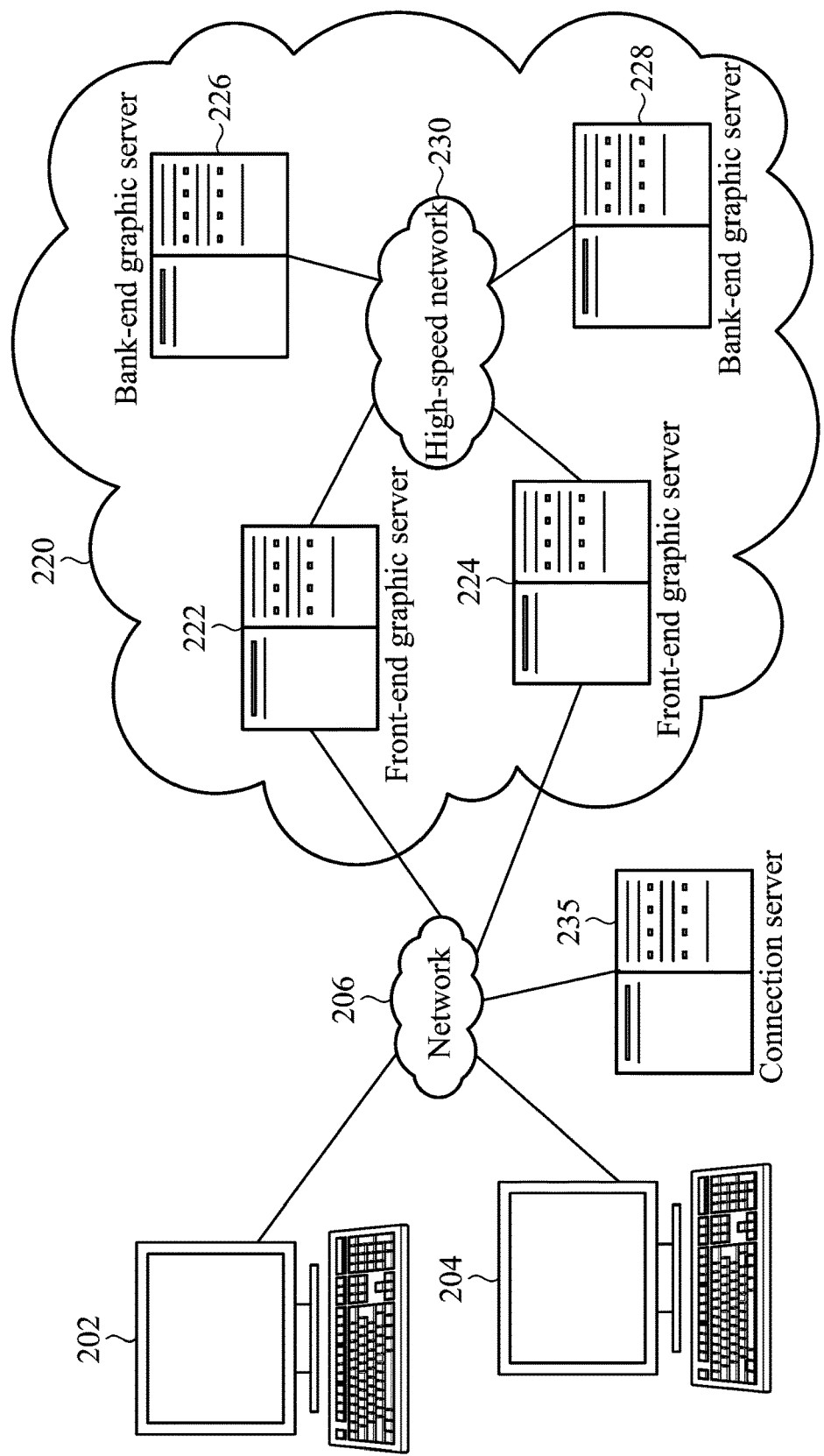
FIG. 2 is a block diagram of a cloud-computing graphic server according to the invention.

Referring to FIG. 2, a block diagram of a cloud-computing graphic server 220 according to the invention is shown. In one embodiment, the cloud-computing graphic server 220 is coupled to a plurality of client hosts 202 and 204 via a network 206, and provides graphic processing services for the client hosts 202 and 204 via the network 206. In one embodiment, the cloud-computing graphic server 220 comprises a connection server 235, a plurality of front-end graphic servers 222 and 224, and a plurality of back-end graphic servers 226 and 228. The connection server 235 and the front-end graphic servers 222 and 224 are directly coupled to the network 206. The back-end graphic servers 226 and 228 are coupled to the front-end graphic servers 222 and 224 via a high-speed network 230. Each of the back-end graphic servers 226 and 228 has at least one graphic processing unit (GPU) to provide graphic processing services.

When the client host 202 wants to enjoy the graphic processing services provided by the cloud-computing graphic server 220, the client host 202 sends a request to the connection server 235 via the network 206. The connection server 235 then searches for the front-end graphic server with the shortest distance from the client host 202 via the network 206 according to the IP address of the client host 202, and then forwards the request sent by the client host 202 to the front-end graphic server. For example, in a case where the front-end graphic server 222 is located at Peking, and another front-end graphic server is located at Shanghai, if the client host 202 is located at Peking, the connection server 235 assigns the front-end graphic server 222 to process the request sent from the client host 202 to reduce the time required for data transmission between the client host 202 and the front-end graphic sever 222. In addition, the connection server 235 compares whether a previous front-end graphic server which processed a previous request sent from the client host 202 is identical to the current front-end graphic server 222. When the previous front-end graphic server is different from the current front-end graphic server 222, the connection server 235 directs the previous front-end graphic server to copy user settings and user data corresponding to the client host 202 to the current front-end graphic server 222 as a reference for processing a current request sent from the client host 202.

The front-end graphic server 222 then receives the request sent by the client host 202 via the network 206, and determines a plurality of application programs required to be executed for processing the request of the client host 202. The front-end graphic server 222 then selects at least one used back-end graphic server to respectively execute the application programs from the back-end graphic servers 226 and 228 of the cloud-computing graphic server 220. In one embodiment, the front-end graphic server 222 detects whether the back-end graphic servers 226 and 228 are in a busy status and detects a network delay of the back-end graphic servers 226 and 228, and then selects the back-end graphic server with low network delay as the used back-end graphic server.

Assume that both the back-end graphic servers 226 and 228 are selected to be the used back-end graphic servers. The used back-end graphic servers 226 and 228 then use the graphic processing units thereof according to instructions from the front-end graphic server 222 to execute the application programs to generate a plurality of graphic surfaces. The graphic surfaces generated by the back-end graphic servers 226 and 228 are sent to the front-end graphic server 222 via the high-speed network. The front-end graphic server 222 then blends the graphic surfaces to generate a windows surface. The front-end graphic server 222 then encodes an encoded windows surface datastream according to a windows surface datastream comprising a series of window surfaces, and then sends the encoded windows surface datastream back to the client host 202 via the network 206. Finally, the client host 202 decodes the encoded windows surface datastream to recover the windows surface datastream, and then displays the windows surface datastream on a screen.

Because the cloud-computing graphic server 220 comprises a plurality of back-end graphic servers, the huge graphic processing capability provided by the back-end graphic servers can be used to simultaneously process requests sent from a plurality of client hosts, and delay is shortened to improve the quality of graphic processing services. In addition, if the back-end graphic servers have different kinds of graphic processing units, because the different graphic processing units are respectively managed by the back-end graphic servers, an integrated management mechanism is not required, and the system design is therefore simplified. Thus, the cloud-computing graphic server 220 has better performance than that of the ordinary graphic server 100.

Figure 3:
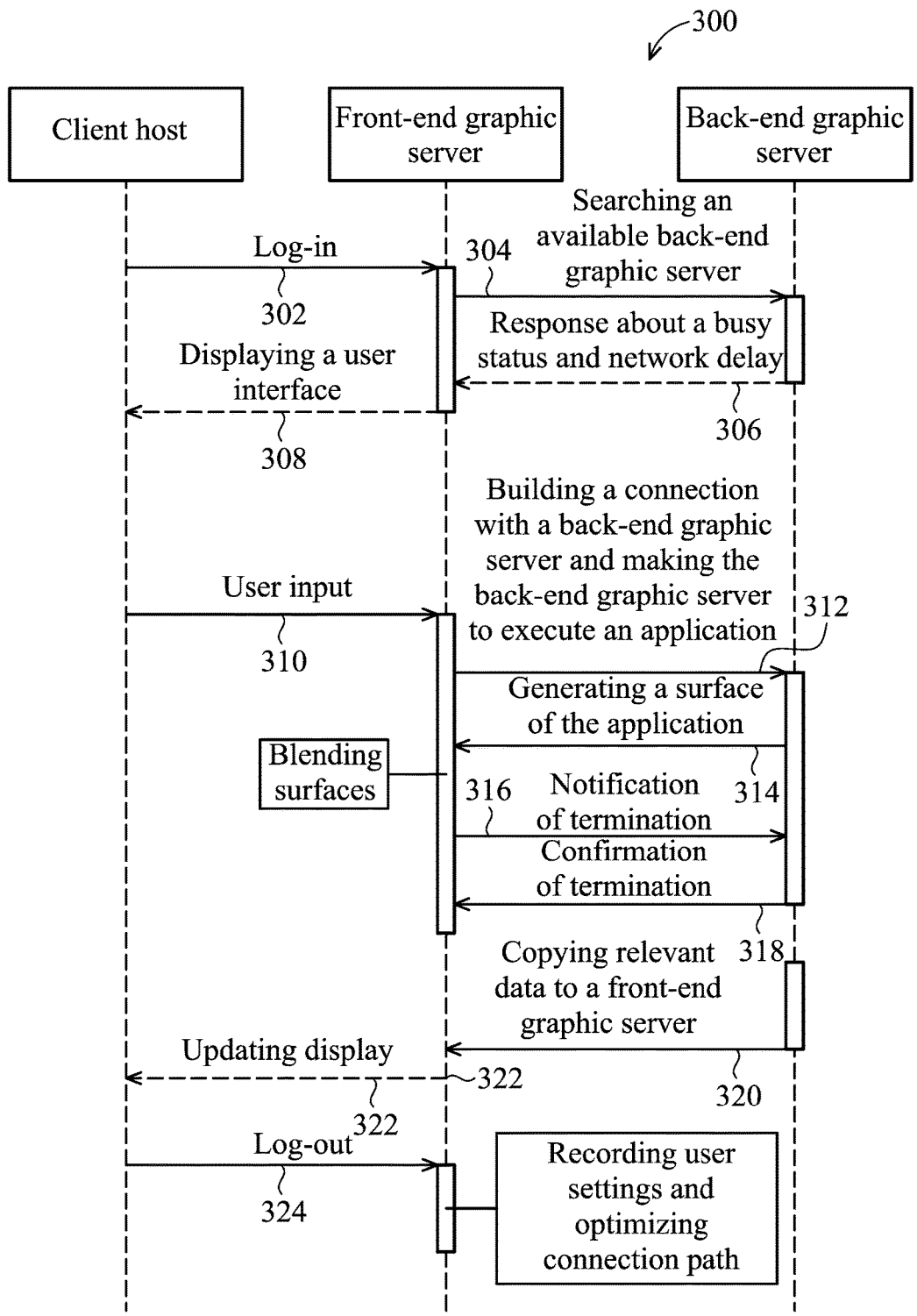
FIG. 3 is a flowchart of operations of a cloud-computing graphic server according to the invention.

Referring to FIG. 3, a flowchart of operations of the cloud-computing graphic server 220 according to the invention is shown. First, the client host logs in to the front-end graphic server via a connection server (step 302). The front-end graphic server then searches the back-end graphic servers of the cloud computing graphic server for available back-end graphic servers (step 304). User data and user interface are then loaded to the front-end graphic server. The back-end graphic server then sends a response about busy statuses and network delay thereof to the front-end graphic server via the high-speed network (step 306). The front-end graphic server then sends the user interface to the client host for display (step 308).

When the client host receives user input, the client host sends the user input to the front-end graphic server via the network (step 310). The front-end graphic server then builds a connection with a back-end graphic server and directs the back-end graphic server to execute an application program (step 312). If the back-end graphic server does not comprise the application program, the front-end graphic server loads the application program to the back-end graphic server. The back-end graphic server then executes the application program and uses a graphic processing unit to generate a graphic surface corresponding to the application program, and then sends the graphic surface to the front-end graphic server (step 314).

The front-end graphic server then blends the graphic surfaces of a plurality of application programs to generate a windows surface, and sends the windows surface to the client host. The front-end graphic server then sends a notification of termination to the back-end graphic server (step 314). The back-end graphic server then sends confirmation of termination to the front-end graphic server (step 318). The back-end graphic server then copies user data to the front-end graphic server for long-term storage (step 320). The front-end graphic server then updates the windows surface displayed on the client host (step 322). The client host then logs out of the front-end graphic server (step 324). Finally, the front-end graphic server records the user settings corresponding to the client host and the network routing data corresponding to the back-end graphic server as a reference for processing the next request sent from the client host.

Figure 4A:
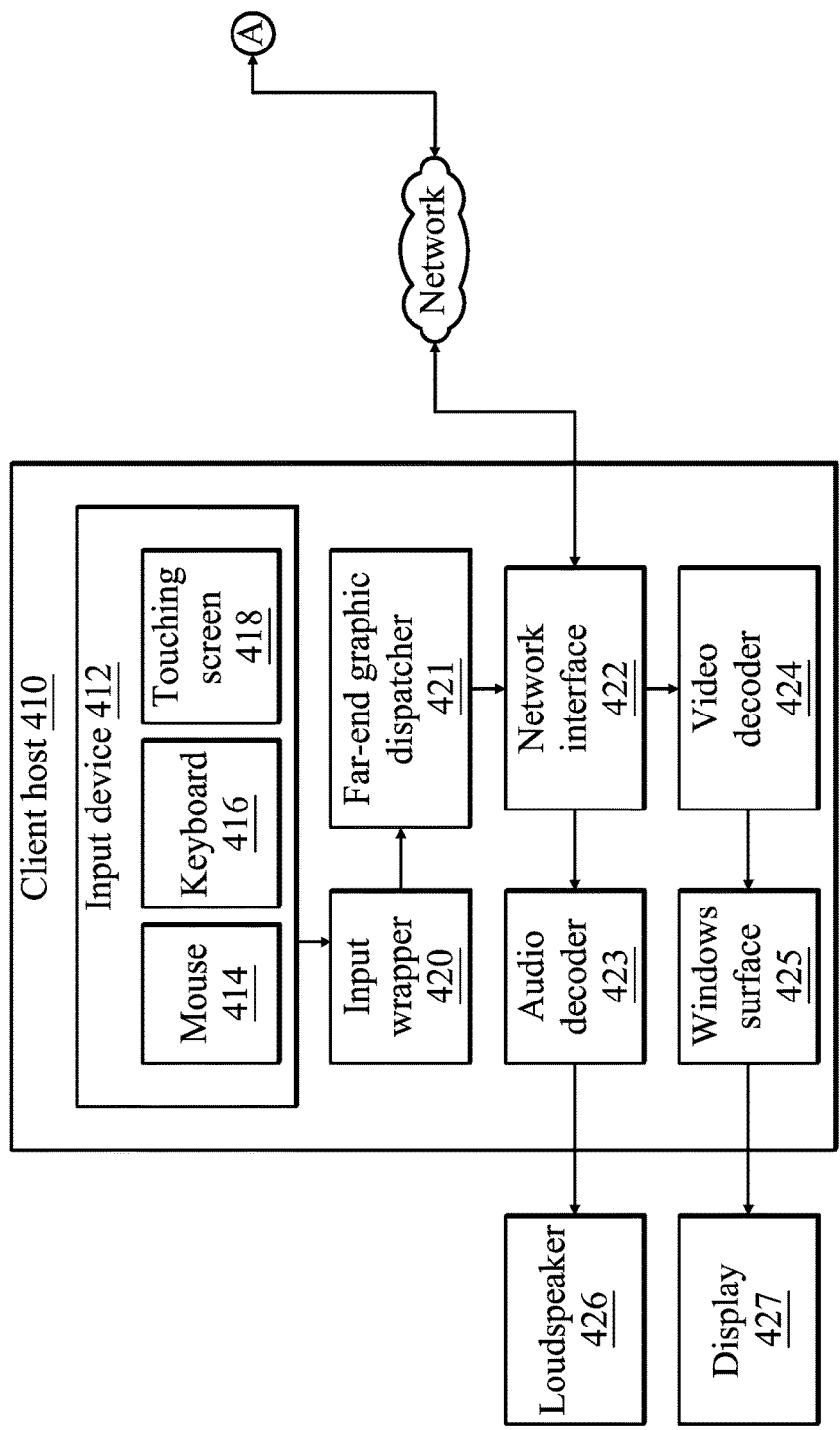
FIGS. 4A, 4B, and 4C are a detailed block diagram of an embodiment of a cloud-computing graphic server according to the invention.
Figure 4B:
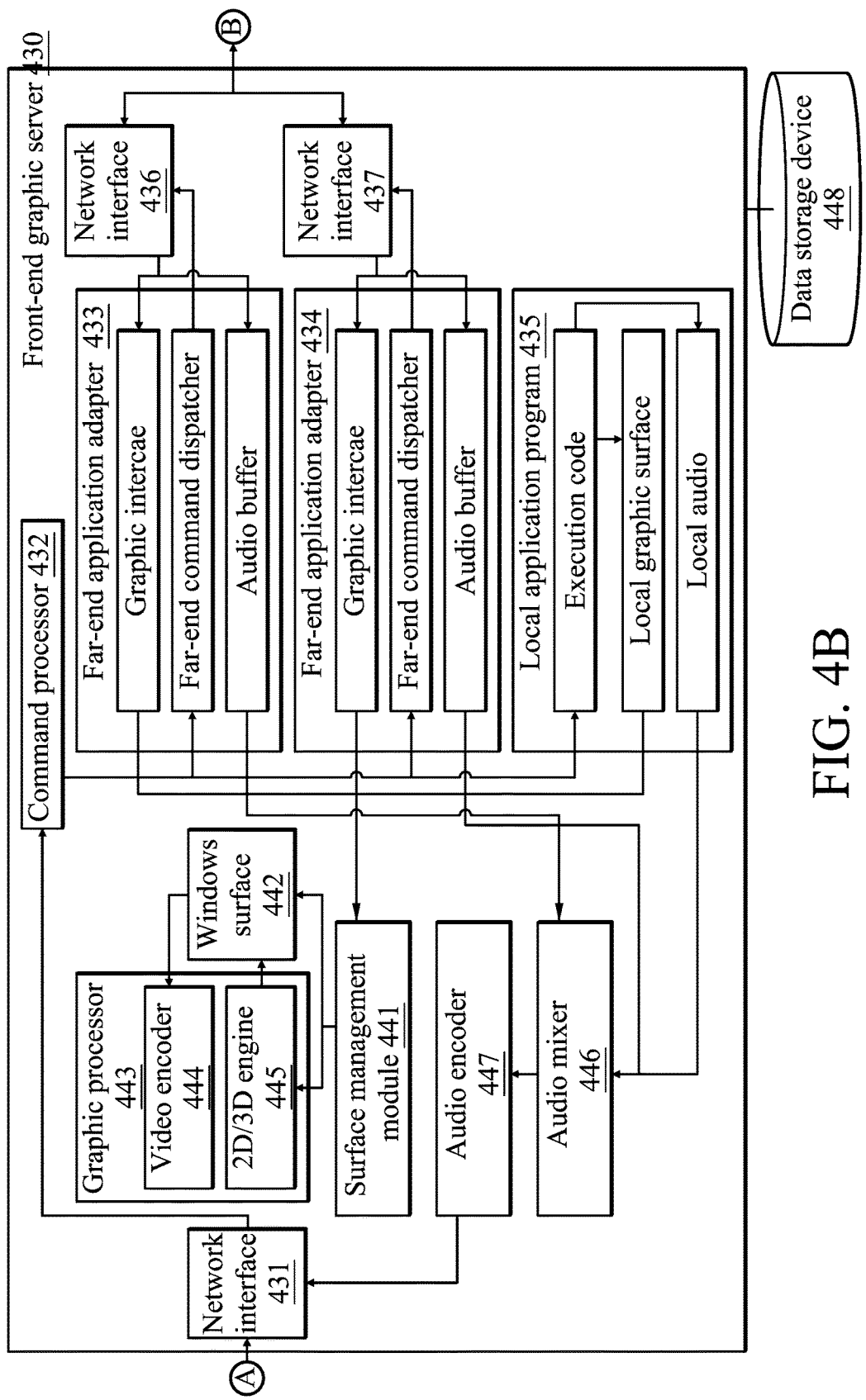
Figure 4C:
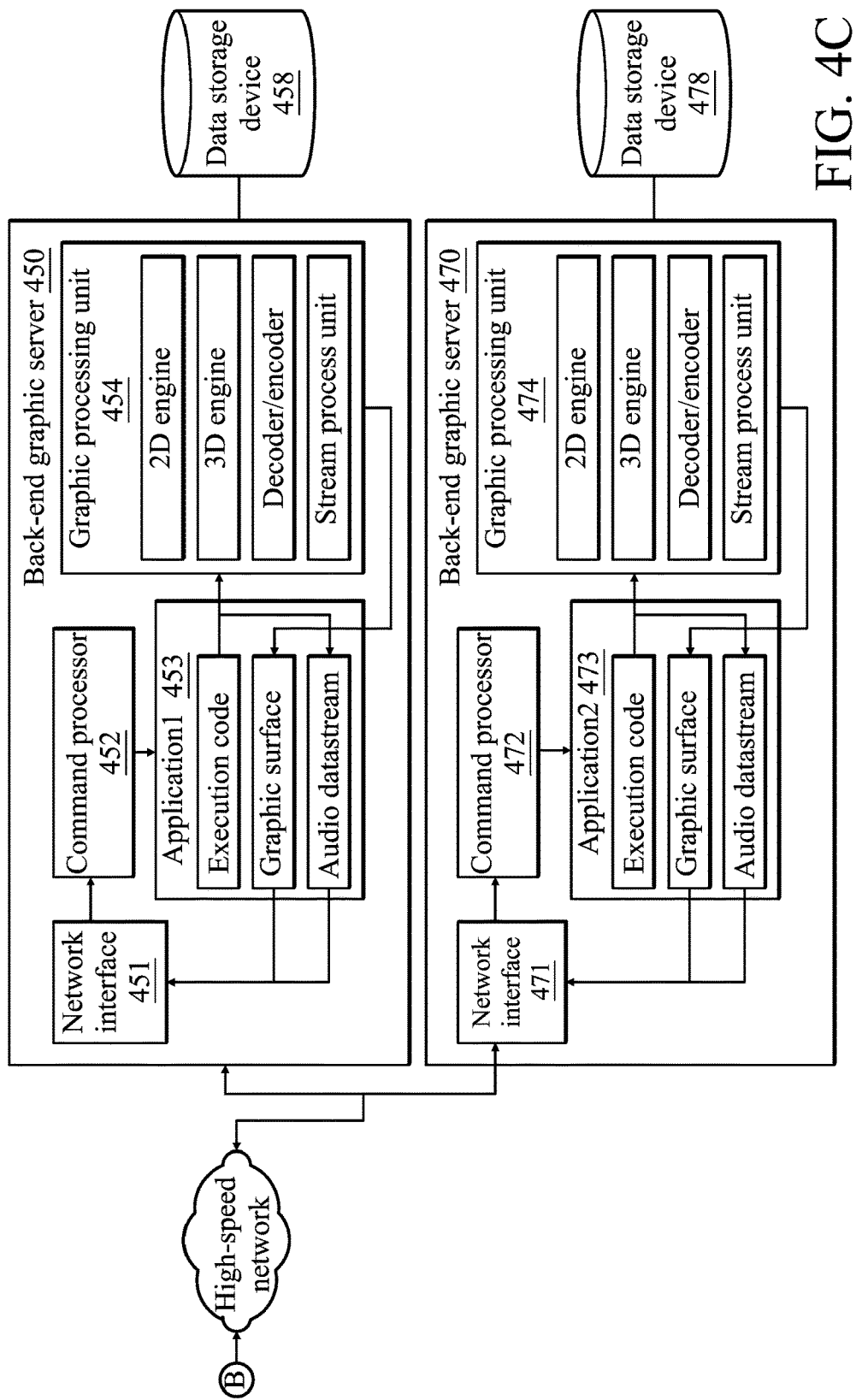

Referring to FIGS. 4A, 4B, and 4C, a detailed block diagram of an embodiment of a cloud-computing graphic server according to the invention is shown. First, the client host comprises an input device 412 for receiving mouse input 414, keyboard input 416, and touch screen input 418. An input wrapper 420 then wraps the mouse input 414, the keyboard input 416, and the touch screen input 418 to obtain a user command. A far-end graphic dispatcher 421 then sends the user command via the network interface 422 to a front-end graphic server 430.

After the front-end graphic server 430 receives the user command via the network interface 431, the front-end graphic server 430 sends the user command to the command processor 432. The command processor 432 then sends the user command to the far-end application adapters 433 and 434 or the local application program 435 for processing according to the application programs corresponding to the user command. The far-end application adapters 433 and 434 respectively correspond to the back-end graphic servers 450 and 470. After the far-end application adapters 433 and 434 receive the user command, the far-end command dispatcher thereof sends the user command to the corresponding back-end graphic servers 450 and 470 via the network interfaces 436 and 437 and the high-speed network. If the local application program 435 receives the user command, the local application program 435 executes the execution code to process the user command to generate a local graphic surface and a local audio.

The back-end graphic servers 450 and 470 respectively correspond to the application programs 453 and 473. After the back-end graphic servers 450 and 470 receive the user command from the high-speed network, the network interfaces 451 and 471 send the user command to the command processors 452 and 472. The command processors 452 and 472 then send the user command to the application programs 453 and 473. The application programs 453 and 473 then execute the execution code according to the user command to generate an execution result. The graphic processing units 454 and 474 then generate graphic surfaces corresponding to the application programs 453 and 473 according to the execution result. In one embodiment, the graphic processing units comprise a 2D engine, a 3D engine, a decoder/encoder, and a stream process unit. In addition, the application programs 453 and 473 also execute the execution code to generate an audio datastream. The network interfaces 451 and 471 then send the graphic surfaces corresponding to the application programs 453 and 473 and audio datastream to the front-end graphic server 430 via the high-speed network.

After the front-end graphic server 430 receives the graphic surfaces and audio datastream from the back-end graphic servers 450 and 470 via the network interfaces 436 and 437, the front-end graphic server 430 stores the graphic surfaces and the audio datastream in the far-end application adapters 433 and 434. The surface management module 441 then blends the graphic surfaces stored in the far-end application adapters 433 and 434 with the local graphic surface generated by the local application program 435 to generate a windows surface 425. A video encoder 444 of the graphic processor 443 then encodes an encoded windows surface according to the windows surface. The network interface 431 then sends the encoded windows surface to the client host 410 via the network. In addition, the audio mixer 446 mixes the audio datastream stored in the far-end application adapters 433 and 434 with the local audio generated by the local application program 435 to generate a mixed audio datastream. The audio encoder 447 then encodes an encoded audio datastream according to the mixed audio datastream, and the network interface 431 then sends the encoded datastream back to the client host 410.

Finally, the client host 410 receives the encoded windows surface and the encoded audio datastream from the front-end graphic server 430 via the network interface 422. The video decoder 424 then decodes the encoded windows surface to obtain a windows surface 425, and the displayer 427 then displays the windows surface 425. Similarly, the audio decoder 423 decodes the encoded audio datastream to obtain an audio datastream, and the loudspeaker 426 then broadcasts the audio datastream.

Figure 5A:
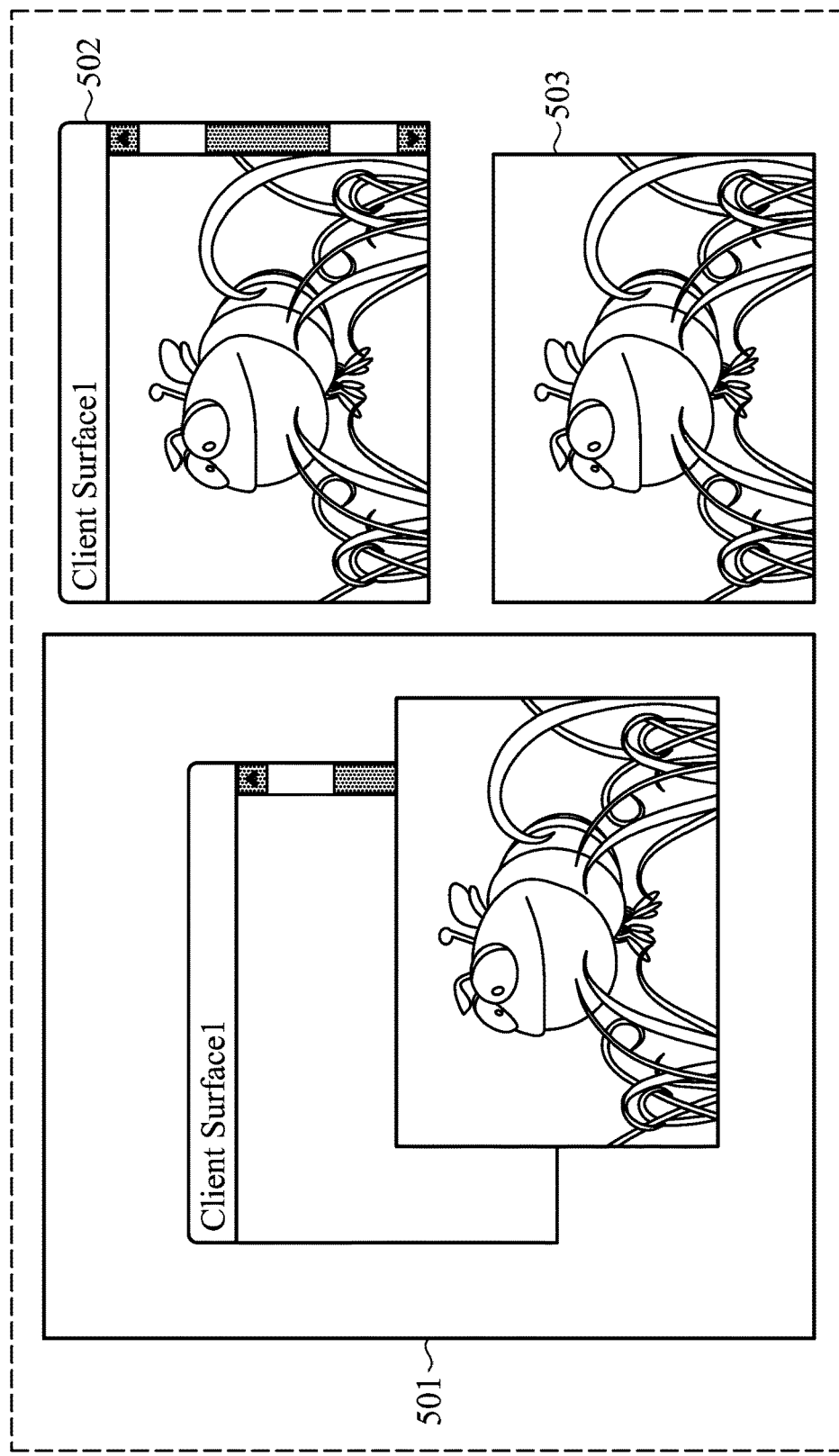
FIG. 5A is a schematic diagram of two graphic surfaces being overlaid to obtain a windows surface according to the invention.
Figure 5C:
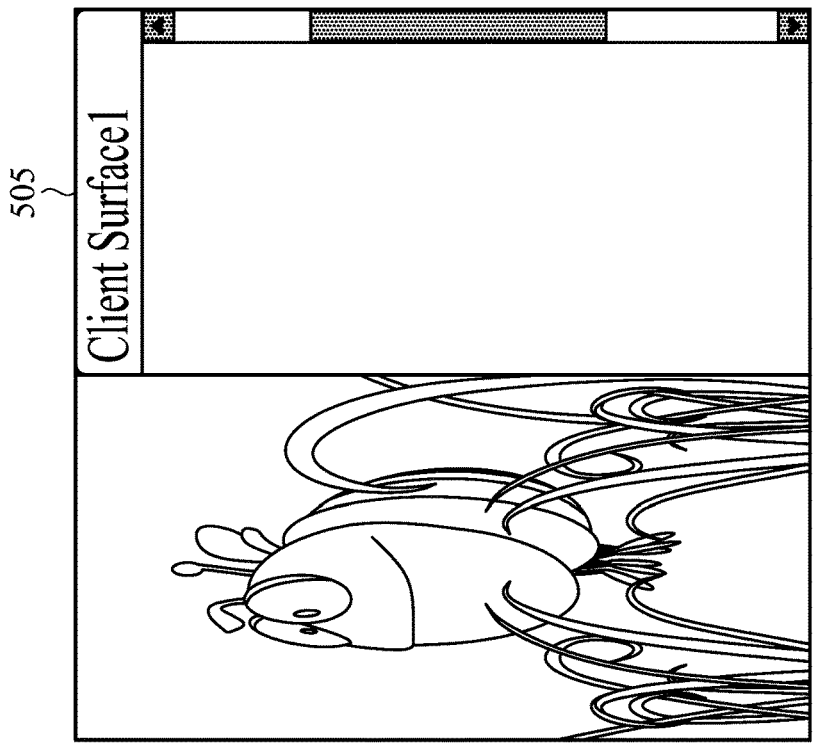
FIG. 5C is a schematic diagram of the scaling of two graphic surfaces to obtain a windows surface according to the invention.
Figure 5B:
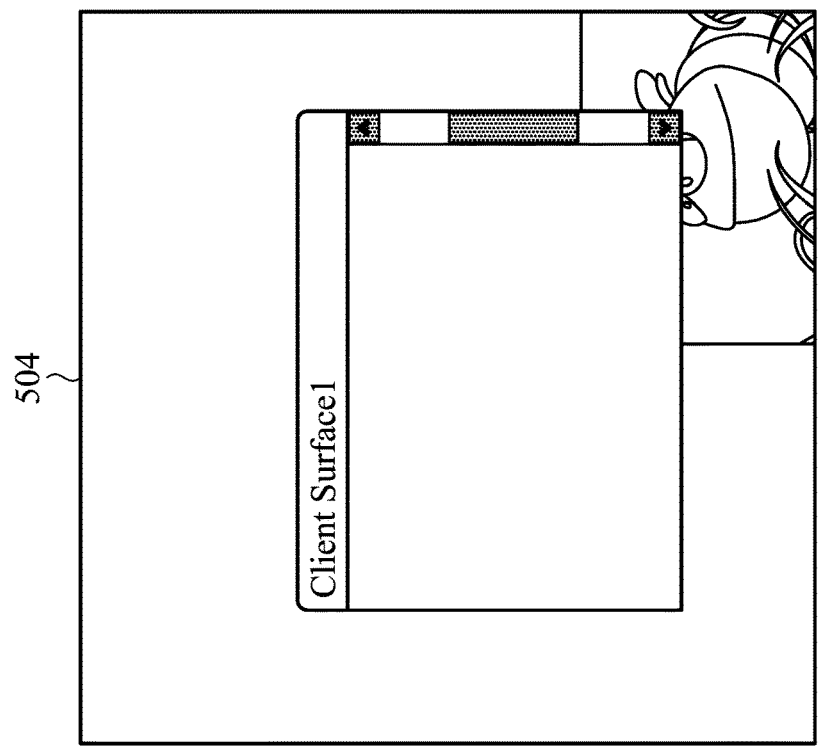
FIG. 5B is a schematic diagram of the clipping of two graphic surfaces to obtain a windows surface according to the invention.
Figure 6:
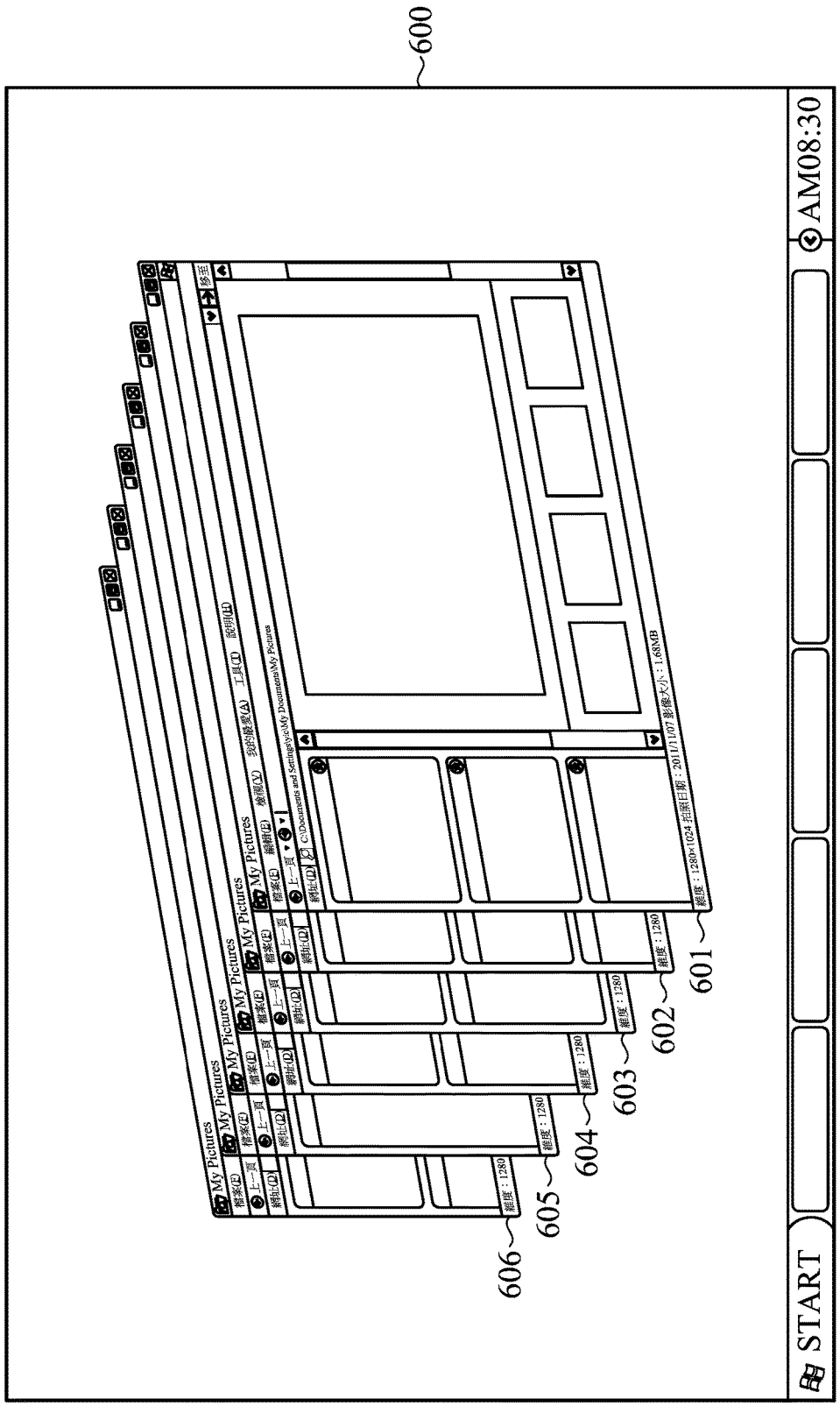
FIG. 6 is a schematic diagram of a plurality of 3D surfaces blended to generate a windows surface according to the invention.

In one embodiment, the front-end graphic server 430 blends the graphic surfaces corresponding to different application programs by clipping, rotating, scaling, and overlaying. FIG. 5A, is a schematic diagram of two graphic surfaces overlaid to obtain a windows surface according to the invention. Assume that the graphic surfaces 502 and 503 are respectively generated by the back-end graphic servers 450 and 470. The front-end graphic server 430 then overlays the graphic surface 502 on the graphic surface 503 to generate the windows surface 501. FIG. 5B is a schematic diagram of the clipping of two graphic surfaces to obtain a windows surface according to the invention. After the front-end graphic server 430 clips the graphic surface 503 generated by the back-end graphic server 470, the clipped graphic surface is overlaid on the graphic surface 502 generated by the back-end graphic server 502 to generate the windows surface 504. FIG. 5C is a schematic diagram of the scaling of two graphic surfaces to obtain a windows surface according to the invention. The front-end graphic server 430 then scales the graphic surfaces 502 and 503 to generate scaled graphic surfaces and then overlays the scaled graphic surfaces to generate the windows surface 505. Similarly, the graphic surfaces generated by the back-end graphic servers may also be 3D surfaces. Referring to FIG. 6, a schematic diagram of the blending of a plurality of 3D surfaces to generate a windows surface according to the invention is shown. Assume that the 3D graphic surfaces 601~606 are respectively generated by a plurality of back-end graphic servers. A front-end graphic server then overlays the 3D graphic surfaces 601~606 to generate the windows surface 600.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cloud-computing graphic server, coupled to a client host via a network, comprising:
  a plurality of back-end graphic servers, respectively comprising at least one graphic processing unit (GPU);
  at least one front-end graphic server, coupled to the back-end graphic servers via a high-speed network, receiving a user command from the client host via the network, determining a plurality of application programs required by the user command, and selecting a plurality of used back-end graphic servers from the back-end graphic servers according to the application programs;
  wherein the front-end graphic server sends the user command to the plurality of used back-end graphic servers via the high-speed network when the application programs of the used back-end graphic servers correspond to the user command, and the front-end graphic server processes the user command by a local application program of the front-end graphic server to generate a local graphic surface when the local application program corresponds to the user command;, wherein after the plurality of used back-end graphic servers receive the user command, the plurality of used back-end graphic servers generate graphic surfaces corresponding to the application programs corresponding to the user command and send the graphic surfaces to the front-end graphic server;

wherein after the front-end graphic server receives the graphic surfaces from the plurality of used back-end graphic servers, the front-end graphic server blends the graphic surfaces from the plurality of used back-end graphic servers with the local graphic surface generated by the local application program to generate a windows surface to be encoded and sent to the client host.

2. The cloud-computing graphic server as claimed in claim 1, wherein the cloud-computing graphic server further comprises:
the plurality of reserved front-end graphic servers, one of which is the front-end graphic server.

3. The cloud-computing graphic server as claimed in claim 2, wherein the connection server selects the reserved front-end graphic server with the shortest distance from the client host as the front-end graphic server according to a network address of the client host.

4. The cloud-computing graphic server as claimed in claim 1, wherein the front-end graphic server receives a user command from the client host from the network, determines a specific application program corresponding to the user command, and transmits the user command to the used back-end graphic server executing the specific application program for processing the user command, wherein the user command may be a mouse input, a keyboard input, or a touch screen input.

5. The cloud-computing graphic server as claimed in claim 1, wherein the back-end graphic servers comprise a 2D engine, a 3D engine, a decoder/encoder, and a stream process unit.

6. The cloud-computing graphic server as claimed in claim 1, wherein when the used back-end graphic servers do not comprise the application programs, the front-end graphic server loads the application programs to the used back-end graphic servers.

7. The cloud-computing graphic server as claimed in claim 1, wherein the used back-end graphic servers copy user data generated by executing the application programs to the front-end graphic server for long-term storage.

8. The cloud-computing graphic server as claimed in claim 1, wherein after the client host logs out, the front-end graphic server records user settings corresponding to the client host and records route data of the used back-end graphic servers as reference for a next request from the client host.

9. A cloud-computing graphic serving method, wherein a cloud-computing graphic server is coupled to a client host via a network, and comprises at least one front-end graphic server and a plurality of back-end graphic servers respectively comprising at least one graphic processing unit (GPU), the front-end graphic server is coupled to the back-end graphic servers via a high-speed network, the cloud-computing graphic serving method comprising:
receiving a user command from the client host via the network by the front-end graphic server;

determining a plurality of application programs required by the user command by the front-end graphic server;

selecting a plurality of used back-end graphic servers from the back-end graphic servers according to the application programs by the front-end graphic server;

sending, by the front-end graphic server, the user command to the plurality of used back-end graphic servers via the high-speed network when the application programs of the used back-end graphic servers correspond to the user command;

processing, by a local application program of the front-end graphic server, the user command to generate a local graphic surface when the local application program corresponds to the user command;

generating graphic surfaces corresponding to the application programs corresponding to the user command and sending the graphic surfaces to the front-end graphic server by the plurality of used back-end graphic servers;

blending the graphic surfaces from the plurality of used back-end graphic servers with the local graphic surface generated by the local application program to generate a windows surface to be encoded and sent to the client host by the front-end graphic server.

10. The cloud-computing graphic serving method as claimed in claim 9, wherein the cloud-computing graphic server further comprises the plurality of reserved front-end graphic servers.

11. The cloud-computing graphic serving method as claimed in claim 10, wherein selection of the front-end graphic server comprises:
selecting the reserved front-end graphic server with the shortest distance from the client host by the connection server as the front-end graphic server according to a network address of the client host.

12. The cloud-computing graphic serving method as claimed in claim 9, further comprising:
receiving a user command from the client host from the network by the front-end graphic server;
determining a specific application program corresponding to the user command by the front-end graphic server; and
transmitting the user command by the front-end graphic server to the used back-end graphic server executing the specific application program for processing the user command;
wherein the user command may be a mouse input, a keyboard input, or a touch screen input.

13. The cloud-computing graphic serving method as claimed in claim 9, wherein the back-end graphic servers comprise a 2D engine, a 3D engine, a decoder/encoder, and a stream process unit.

14. The cloud-computing graphic serving method as claimed in claim 9, wherein execution of the application programs comprises:
when the used back-end graphic servers do not comprise the application programs, loading the application programs to the used back-end graphic servers by the front-end graphic server.

15. The cloud-computing graphic serving method as claimed in claim 9, wherein execution of the application programs further comprises:
copying user data generated by executing the application programs to the front-end graphic server for long-term storage by the used back-end graphic servers.

16. The cloud-computing graphic serving method as claimed in claim 9, further comprising:

after the client host logs out, recording user settings corresponding to the client host and route data of the used back-end graphic servers as reference by the front-end graphic server for a next request from the client host.

* * * * *